Figure 1:
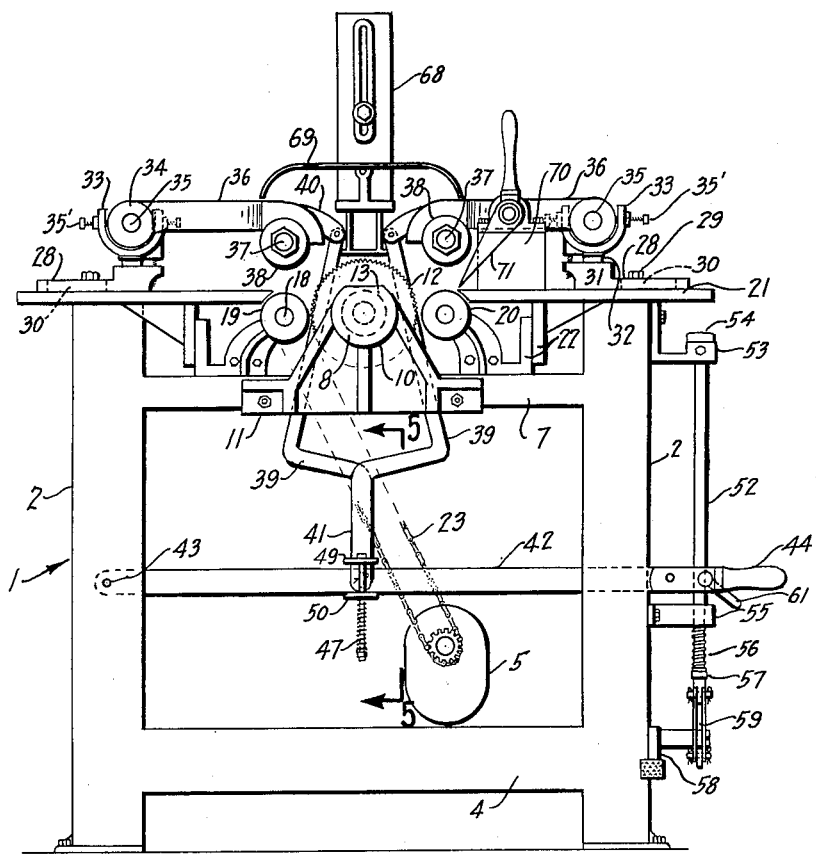

March 18, 1952 J. J. MILLER 2,589,624
ROTARY SAW WITH SWINGABLE TENSION ROLLERS
Filed Jan. 30, 1948 4 Sheets-Sheet 1

INVENTOR.
Joseph J. Miller
BY
A. Schapp
ATTORNEY

March 18, 1952 J. J. MILLER 2,589,624
ROTARY SAW WITH SWINGABLE TENSION ROLLERS
Filed Jan. 30, 1948 4 Sheets-Sheet 2

INVENTOR.
Joseph J. Miller
BY
ATTORNEY

March 18, 1952   J. J. MILLER   2,589,624
ROTARY SAW WITH SWINGABLE TENSION ROLLERS
Filed Jan. 30, 1948   4 Sheets-Sheet 3

INVENTOR.
Joseph J. Miller
BY
A. Schapp
ATTORNEY

March 18, 1952     J. J. MILLER     2,589,624
ROTARY SAW WITH SWINGABLE TENSION ROLLERS
Filed Jan. 30, 1948     4 Sheets-Sheet 4

INVENTOR.
Joseph J. Miller
BY
*A. Schapps*
ATTORNEY

Patented Mar. 18, 1952

2,589,624

UNITED STATES PATENT OFFICE 2,589,624

ROTARY SAW WITH SWINGABLE TENSION ROLLERS

Joseph J. Miller, San Francisco, Calif., assignor to Philip A. Sussman and Ellis H. Jacobs, San Francisco, Calif.

Application January 30, 1948, Serial No. 5,230

2 Claims. (Cl. 144—247)

The present invention relates to improvements in a rotary saw with swingable tension rollers and its principal object is to provide a rotary saw that has various features of adjustment incorporated therein so as to render the machine available for use in connection with saw blades of widely varying diameter.

A further object of the invention is to provide feed rolls and material supporting tables on opposite sides of the saw blade in such a manner that the rolls and the tables are individually adjustable toward or away from the blade. This allows the material feeding and supporting means to be brought up directly to the saw blade, regardless of its diameter within the range of the machine, so that the material is rigidly supported at the point where the cutting action takes place.

It is further proposed to provide tension rolls adapted for riding on top of the material or stock that passes through the machine and to make the tension rolls individually adjustable toward and away from the vertical center plane of the blade so as to cause the tension rolls to register with the feed rolls.

It is further proposed to mount the tension rolls with freedom of swinging movement about axes spaced from the vertical plane of the blade axis and to provide a common spring for the two rolls tending to urge the same upon the upper face of the stock.

It is further contemplated, in the present invention, to provide a common positioning means for the tension rolls with respect to the tensioning means whereby the gap between the feed rolls and the tension rolls may be adjusted to correspond approximately to the thickness of the stock passing through the machine.

It is further proposed to provide independent tension means for adjusting the tension of each of the tension rolls with respect to the positioning means whereby the rolls may be set to individually maintain their grip on the stock even in cases where the stock is of varying thickness.

And finally, it is proposed to provide a common drive for all the rolls arranged to automatically adjust itself for driving the feed rolls and the tension rolls in opposite directions regardless of the selected adjustments for the rolls.

Further objects and advantages of my invention will appear as the specification proceeds, and the novel features of my invention will be fully defined in the claims attached hereto.

Figure 5:
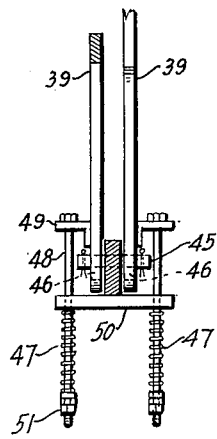
Figure 2:
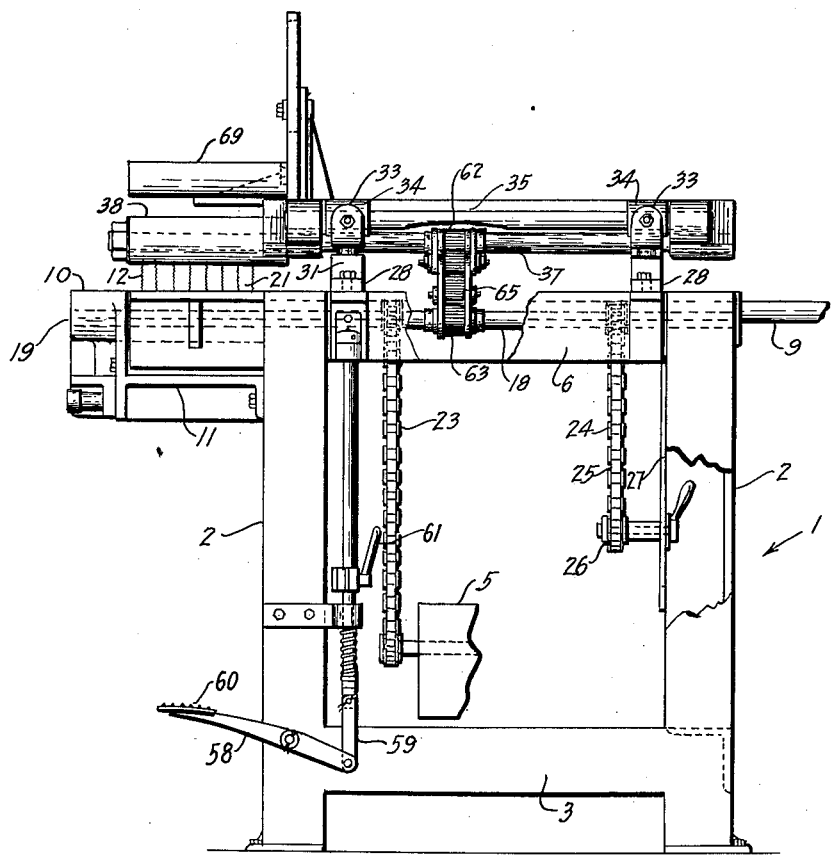
Figure 3:
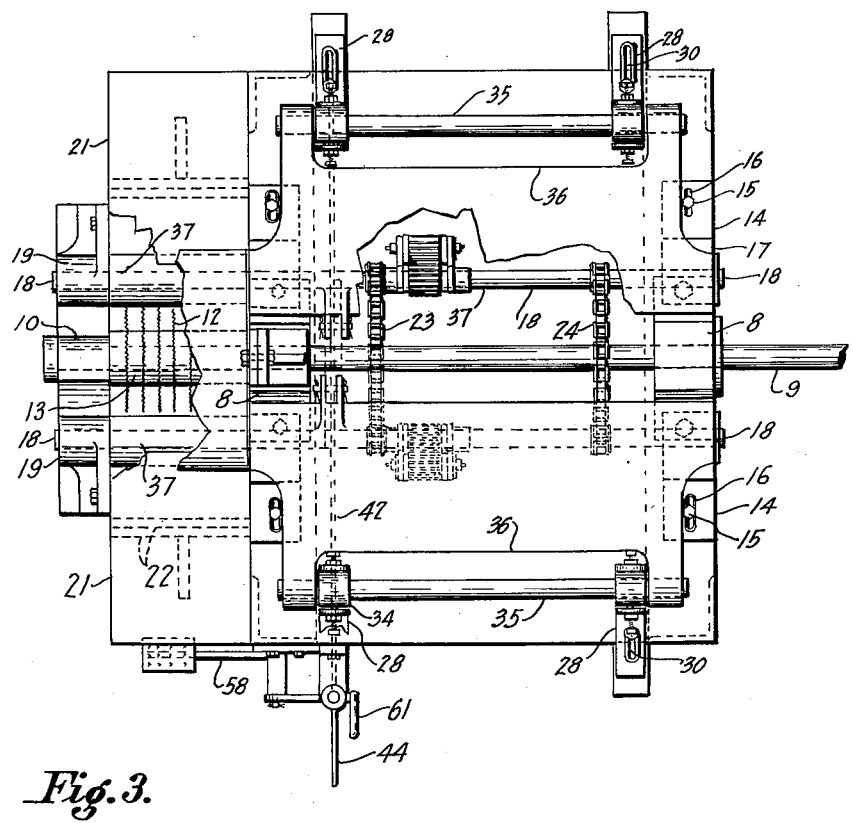
Figure 4:
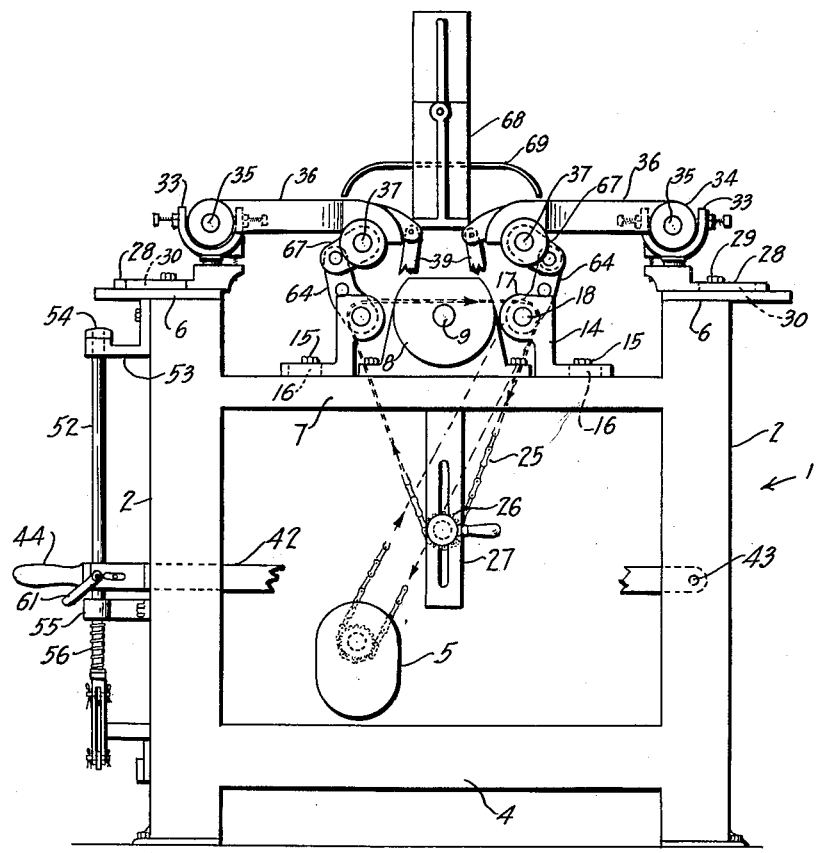
Figure 6:
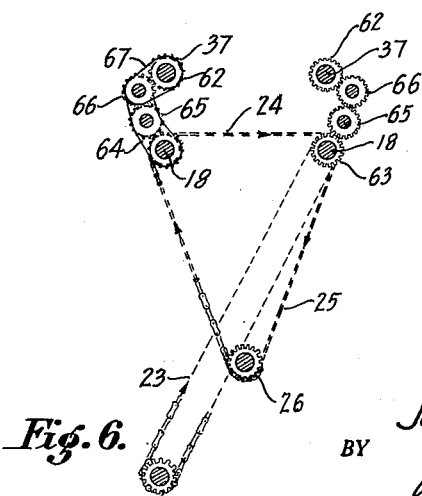

The preferred form of the invention is illustrated in the accompanying drawings, in which Figure 1 shows a front view of my rotary saw,
Figure 2, a side view of the same,
Figure 3, a top plan view of the machine,
Figure 4, a rear view of the machine,
Figure 5, Sheet 1, a sectional detail view along line 5—5 of Figure 1, and
Figure 6, Sheet 4, a detail view of a gear drive used in my invention.

While I have shown only the preferred form of my invention, I wish to have it understood that various changes and modifications may be made within the scope of the claims attached hereto without departing from the spirit of the invention.

Referring to the drawings in detail, the main frame 1 of my machine is preferably rectangular in form and comprises four legs 2 suitably braced, near their lower ends, by side members 3 and cross-members 4 connected to form a supporting structure for the motor 5. The upper ends of the legs are inter-connected by side members 6, the upper edges of which come substantially flush with the upper edges of the legs, and transverse members 7 disposed somewhat below the upper edges of the legs so as to form a longitudinal bed between the legs.

The transverse members 7 serve as supporting means for two main bearings 8 which are located centrally with respect to the frame and which support the main shaft 9. The rear end of the shaft extends rearwardly beyond the frame and is adapted for connection to a suitable source of power.

The front end of the shaft projects beyond the front of the main frame, and its extreme end is supported in a third bearing 10 which latter is mounted forwardly of the frame on brackets 11 supported by the frame. The projecting portion of the main shaft carries one or more circular saw blades 12 which may be spaced by suitable collars 13. It should be noted that my saw is particularly intended for a multiple saw having a number of blades arranged on the main shaft.

The transverse frame members 7 have brackets 14 mounted on opposite sides of the main bearings, these brackets being adjustable toward and away from the main bearings. They are secured by means of bolts 15 extending through transverse slots 16 in the brackets into the frame members.

The brackets have bearings 17 paralleling the main shaft and have side shafts 18 supported in the bearings. The brackets on the front frame members 7 are suitably extended to furnish third bearings 19 for projecting ends of the side shafts.

The projecting ends have rolls 20 mounted thereon, and the side shafts and the rolls are positioned and dimensioned to bring the upper faces of the rolls into the horizontal plane of the upper faces of the collars on the main shaft.

The brackets 14 at the front end of the machine also carry tables 21 secured by means of cooperating flanges 22, the upper faces of the tables being in a plane with the upper faces of the rolls and those of the collars of the main shaft.

The tables 21 and the rolls 20 thus are adjustable toward and away from the blade carrying section of the main shaft as a unit upon loosening of the bolts 15, whereby the rolls may be brought up closely to the blades regardless of the diameter of the latter. My machine, as actually built, is intended to accommodate blades ranging from 6" to 10" in diameter.

The rolls 20 are intended to serve as feed rolls and are actuated for rotating in the same direction by the motor 5, the shaft of which is connected to one of the rolls by means of a chain drive 23, while the second roll is connected to the first roll by means of a second chain drive 24 which latter has a depending section 25 idling over a sprocket 26 mounted in a fixed frame member 27 with freedom of vertical adjustability to compensate for adjustments in the spacing between the side shafts.

Thus the feed rolls and the tables are adjustable toward and away from the main shaft and the rolls are rotated to feed stock to the blades and to pull the stock past the blades while the drive means is arranged to compensate for any desired adjustment of the rolls within the range of the machine.

Each of the side frame members carries a pair of brackets 28 adjustable toward and away from the center line of the machine by means of bolts 29 passing through slots 30 in the brackets. Each of the brackets furnishes a bearing 31 for supporting a vertical stub shaft 32 terminating in a fork 33 which again supports a horizontal bearing 34 with freedom of adjustability between set screws 35'. The two bearings 34 on each side of the machine support a shaft 35, and each of the latter two shafts has a swinging frame 36 mounted thereon, the swinging frames extending toward one another and toward the central plane of the machine.

The length of each swinging frame corresponds substantially to the length of the machine and the inner ends of the two frames have horizontal shafts 37 mounted therein, substantially in the vertical planes of the feed roll shafts. The forward ends of the shafts 37 project forwardly beyond the main frame and the forward projections carry the tension rolls 38 disposed above the feed rolls and cooperable therewith in confining the stock therebetween and in advancing the stock through the machine. The tension rolls are thus adjustable toward the vertical center plane of the machine in the same manner as the feed rolls.

The inner ends of the swinging frames 36 are supported by two links 39 attached to short brackets 40 projecting from the frames. The two links are shaped to clear the main shaft and terminate in substantially parallel lower ends 41 anchored, with freedom of vertical play, to an intermediate section of a cross-arm 42 pivoted to one side of the machine as at 43, and terminating in a handle 44 projecting beyond the other side of the machine. See Figure 4.

The links are anchored to the cross-arm by means of a pin 45 (Fig. 5) extending through the arm and through short vertical slots 46 in the links, which gives each of the links a certain amount of individual play with respect to the pin. The links are normally urged downward, with respect to the arm, by means of springs 47 mounted on bolts 48, the heads of which rest on small flanges 49 projecting sidewise from the links while the shanks of the bolts pass through a plate 50 secured upon the bottom of the arm and project downwardly therefrom. The lower ends of the bolts carry the springs, which latter bear on the underface of the plate and on nuts 51 secured upon the lower ends of the bolts. The tension of each spring may thus be adjusted individually and each link is mounted with individual freedom of rising movement with respect to the arm against the tension of its spring.

The outer end of the arm is adjustably secured upon a vertical shaft 52 suspended from a bracket 53 projecting from the side of the main frame, by means of a head 54, the shaft being held in vertical position by a second bearing 55 and being urged downward by a strong spring 56 pressing against the underface of the bearing and a shoulder 57 at the lower end of the shaft. A foot-operated lever 58 is connected to the lower end of the shaft 52 by means of links 59. When the pedal 60 of the lever is depressed, the shaft 52 rises against the tension of the spring 56.

The arm 42 is secured upon the shaft 52 by means of a split section adapted to be tightened upon the shaft by operation of a handle 61.

Due to this construction the free ends of the swinging frames 36 are normally supported, through the links 39 and the arm 42, by the shaft 52, which again is suspended from the bracket 53. The spring 56 urges the shaft downward and thereby tensions both tension rolls to bear down on the stock, while the two springs 47 individually tension the two tension rolls.

In operation, the gap between the feed rolls and the tension rolls is first adjusted to be somewhat less than the thickness of the stock to be cut by adjustment of the outer end of the arm 42 on the vertical shaft 52. As the stock passes between the rolls it slightly raises the tension rolls thereby placing the springs and the tension rolls under tension. If the surfaces of the stock are parallel the tension on the two springs 47 will be the same. But if the surfaces are not parallel, and the stock is wedge-shaped, for instance, each of the springs 56 exerts independent downward pressure and causes its respective tension roll to bear down on the stock regardless of the action of the other tension roll, with the result that the tension on the thinner end of the stock is substantially the same as on the thicker end. In case the differences in thicknesses at different points of the stock are very pronounced, the individual adjustability of the tension of each spring 56 will still enable the operator to bring about substantially equal tension at both tension rolls.

For quick release of the tension the operator merely steps on the foot-pedal which raises the shaft 52 and both of the tension rolls.

The tension rolls also serve as feed rolls and are rotated in a direction opposite to that of the lower feed rolls so as to urge the stock in the same direction.

Each tension roll shaft is driven from its companion feed roll shaft in such a manner as to allow of the various adjustments hereinabove explained without interfering with the drive. This is accomplished by the four-pinion drive illustrated in detail in Figure 6, in which the two shafts 37 and 18 are shown in a selected position. These two shafts have the pinions 62 and 63 mounted thereon. The shaft 18 carries an arm 64 which supports a pinion 65 meshing with pinion 63, and a second pinion 66 meshing with pinion 65. The shaft 37 carries an arm 67 the free end of which is pivoted to the arm 64 at the axis of pinion 66, the length of arm 67 being such as to cause pinion 66 to mesh with pinion 62. This arrangement allows of horizontal sliding movement of each of the shafts 18 and 37 with respect to the other and also of swinging movement of the shaft 37 with respect to the shaft 18, as called for in the organization described. It also transmits rotary motion in opposite directions from shaft 18 to shaft 37 so as to cause each of the tension rolls to rotate in a direction opposite to that of its companion feed roll.

The main frame carries a superstructure 68 which adjustably supports a shield 69 over the tension rolls, and a bracket 70 which carries a plurality of dogs 71 to prevent so-called kickback of the material. Illustration of the latter feature has been omitted from some of the figures as not of particular interest for the purposes of the present invention.

In operation, material is fed from the right hand toward the left hand table to pass between the lower feed rolls 20 and the upper tension rolls 38, and the material is successively gripped and advanced by the feed and tension rolls to pass the saw blades. The upper faces of the tables and the feed rolls lie in the horizontal plane of the collars on the main shaft, and the feed rolls may be readily adjusted to come up close to the blades so that the material is firmly supported at the point where the cutting action takes place.

The tension rollers may be similarly adjusted toward and away from the central plane of the machine for cooperative relation with the feed rolls. They may also be readily adjusted to the thickness of the stock by positioning the free end of the arm 42 on the shaft 52. The tension of each tension roll may be individually adjusted by adjustment of the nuts 51, which may set the springs 56 to the same tension or to different degrees of tension.

As the material passes through the machine, both tension rolls are subject to the pressure of the main spring 56, and each individual tension roll is subject to the pressure of its spring 47, so that each may yield individually without affecting the grip of the other. In case the material fed is tapered, the tension of the springs 47 may be adjusted to exert substantially the same pressure on the thinner end as on the opposite end. The pressure of both tension rolls may be relieved by exerting foot-pressure on the pedal 60.

I claim:

1. In a rotary saw of the character described, a main frame having two side frames, a pair of brackets mounted on each side frame, bearings carried by the brackets, frames swingable in the bearings and having free ends projecting toward and in close proximity to one another, tension rolls mounted in the free ends of the swingable frames, links supporting the free ends of the swingable frames and extending downwardly and having slotted lower ends, an arm extending transversely across the main frame and having one end pivoted in one side frame and a free end projecting beyond the other side frame, a plate secured upon the underface of the arm, brackets projecting from the links above the slotted ends, bolts suspended in the latter brackets and passing through the plate, springs surrounding the bolts below the plate and bearing on the underside of the plate, nuts threaded on the lower ends of the bolts for individually tensioning the springs, and means for supporting the free end of the arm with freedom of upward movement against spring pressure.

2. In a rotary saw of the character described, a main frame having two side frames, a pair of brackets mounted on each side frame, bearings carried by the brackets, frames swingable in the bearings and having free ends projecting toward and in close proximity to one another, tension rolls mounted in the free ends of the swingable frames, links supporting the free ends of the swingable frames and extending downwardly and having slotted lower ends, an arm extending transversely across the main frame and having one end pivoted in one side frame and a free end projecting beyond the other side frame, a plate secured upon the underface of the arm, brackets projecting from the links above the slotted ends, bolts suspended in the latter brackets and passing through the plate, springs surrounding the bolts below the plate and bearing on the underside of the plate, nuts threaded on the lower ends of the bolts for individually tensioning the springs, and means for supporting the free end of the arm with freedom of upward movement against spring pressure, the latter means comprising a bracket projecting from the second side frame above the free end of the arm, a shaft vertically suspended from the latter bracket, means for securing the free end of the arm upon the shaft, a bearing for the shaft secured upon the frame below the securing means, a shoulder mounted on the shaft below the bearing, and a spring surrounding the shaft between the bearing and the shoulder to urge the shaft downward.

JOSEPH J. MILLER.

REFERENCES CITED

The following references are of record in the file of this patent:

UNITED STATES PATENTS

| Number | Name | Date |
|---|---|---|
| 132,854 | Nichols | Nov. 5, 1872 |
| 140,570 | Appleton | July 8, 1873 |
| 143,325 | Brower et al. | Sept. 30, 1873 |
| 268,966 | White | Dec. 12, 1882 |
| 273,817 | Chapman | Mar. 13, 1883 |
| 299,653 | Lane et al. | June 3, 1884 |
| 334,663 | Hinkley | Jan. 19, 1886 |
| 398,048 | Hutchinson et al. | Feb. 19, 1889 |
| 494,887 | Peterson | Apr. 4, 1893 |
| 509,405 | Stroh et al. | Nov. 28, 1893 |
| 1,255,625 | Mitchell | Feb. 5, 1918 |
| 1,390,777 | Gathman | Sept. 13, 1921 |
| 1,582,027 | Dunbar | Apr. 27, 1926 |

FOREIGN PATENTS

| Number | Country | Date |
|---|---|---|
| 18,280 | Sweden | Sept. 24, 1904 |
| 480,711 | Germany | Aug. 7, 1929 |
| 444,617 | Great Britain | Mar. 24, 1936 |